United States Patent
Arimilli et al.

(10) Patent No.: US 6,581,116 B1
(45) Date of Patent: Jun. 17, 2003

(54) METHOD AND APPARATUS FOR HIGH PERFORMANCE TRANSMISSION OF ORDERED PACKETS ON A BUS WITHIN A DATA PROCESSING SYSTEM

(75) Inventors: Ravi Kumar Arimilli, Austin, TX (US); Vicente Enrique Chung, Austin, TX (US); Warren Edward Maule, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/437,042

(22) Filed: Nov. 9, 1999

(65) Prior Publication Data
(65)

(51) Int. Cl.⁷ .............................................. G06F 13/00
(52) U.S. Cl. ............................ 710/110; 710/7; 710/29; 710/36; 710/107
(58) Field of Search ................. 710/110, 19, 4, 710/7, 5, 29, 36, 107, 305; 709/213; 714/18; 370/912

(56) References Cited

U.S. PATENT DOCUMENTS

| | | | | |
|---|---|---|---|---|
| 4,272,815 A | * | 6/1981 | Kadowaki et al. | 710/21 |
| 4,740,889 A | * | 4/1988 | Motersole et al. | 709/213 |
| 5,261,063 A | * | 11/1993 | Kohn et al. | 710/19 |
| 5,497,498 A | * | 3/1996 | Taylor | 710/21 |
| 5,689,713 A | * | 11/1997 | Normoyle et al. | 345/418 |
| 6,035,348 A | * | 3/2000 | Webber et al. | 710/54 |
| 6,360,278 B1 | * | 3/2002 | Lo | 709/213 |

OTHER PUBLICATIONS

James L. Peterson, Abraham Silberschatz, Operating System Concepts, 1985, Addison Westley, 2nd edition, pp. 17–18.*

* cited by examiner

Primary Examiner—Gopal C. Ray
Assistant Examiner—Justin King
(74) Attorney, Agent, or Firm—Volel Emile; Bracewell & Patterson, L.L.P.

(57) ABSTRACT

A method for transmitting ordered packets on a bus within a data processing system is disclosed. A data processing system includes a bus connected between a bus master and a bus slave. The bus master consecutively issues multiple packets, such as command packets, to the bus slave on the bus. The packets include order sensitive packets and non-order sensitive packets. In response to a temporary inability of the bus slave to process a particular one of the order sensitive packets due to a lack of resources, the bus slave keeps retrying the particular order sensitive packet. When resources become available, the bus slave processes the retried order sensitive packets in order while allowing the retried non-order sensitive packets to be processed in any order.

15 Claims, 3 Drawing Sheets

METHOD AND APPARATUS FOR HIGH PERFORMANCE TRANSMISSION OF ORDERED PACKETS ON A BUS WITHIN A DATA PROCESSING SYSTEM

BACKGROUND OF THE INVENTION

1. Technical Field

The present invention relates to a data processing system in general, and in particular to a method of transmitting packets. Still more particularly, the present invention relates to a method of transmitting command packets on a bus within a data processing system

2. Description of the Prior Art

Within a data processing system, various devices, such as a processor, a system memory, etc., are typically interconnected with each other via a group of wires known as a bus. In fact, the technique of using a bus to transmit data has been in common use since the early days of electronic computers. Two types of buses are typically utilized in a data processing system, namely, a data bus and an address bus. As their names imply, the data bus is utilized to transmit data, and the address bus is utilized to transmit addresses. There are many advantages in using a single interconnect such as a bus for interconnecting devices within a data processing system. For example, new devices can easily be added or even be ported between data processing systems that use a common bus.

According to the prior art, command packets are sent from a bus master to a bus slave of a bus in a serial manner. Specifically, the bus master initially sends a command packet to the bus slave, and the bus slave replies by sending a response back to the bus master after the command packet has been accepted. With this type of serial transmission arrangement, a bottle-neck can easily occur on a uni-directional bus. Thus, it is desirable to provide an improved method of transmitting command packets on a bus within a data processing system.

SUMMARY OF THE INVENTION

In accordance with a preferred embodiment of the present invention, a data processing system includes a bus connected between a bus master and a bus slave. The bus master consecutively issues multiple packets, such as command packets, to the bus slave on the bus. The packets include order sensitive packets and non-order sensitive packets. In response to a temporary inability of the bus slave to process a particular one of the order sensitive packets due to a lack of resources, the bus slave keeps retrying the particular order sensitive packet. When resources become available, the bus slave processes the retried order sensitive packets in order while allowing the retried non-order sensitive packets to be processed in any order.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
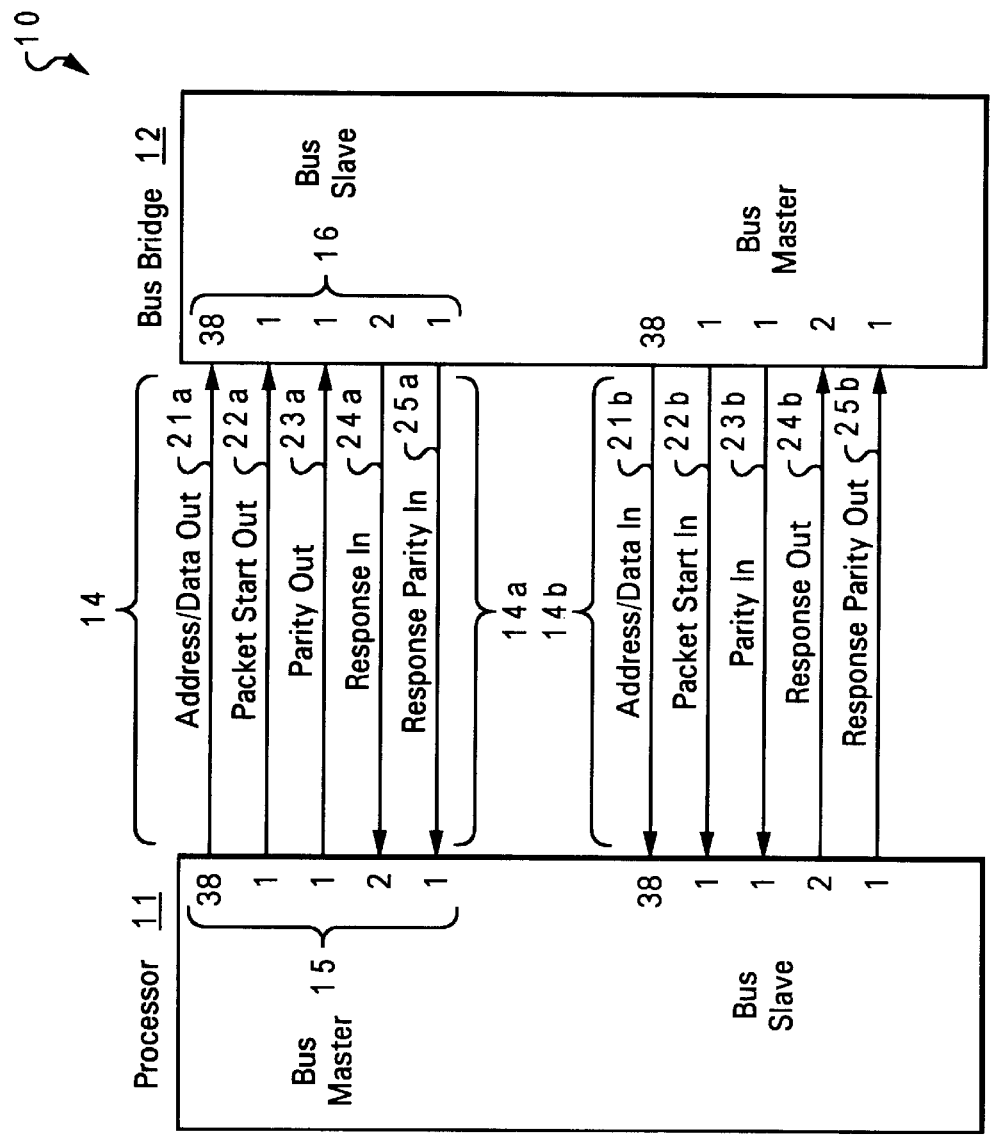
FIG. 1 is a block diagram of a data processing system in which a preferred embodiment of the present invention is incorporated.

Referring now to the drawings and in particular to FIG. 1, there is depicted a block diagram of a data processing system in which a preferred embodiment of the present invention is incorporated. As shown, a data processing system 10 is represented by two devices, namely, a processor 11 and a bus bridge 12. For the purpose of illustrating the present invention, only processor 11 and bus bridge 12 are shown in FIG. 1; however, it is understood by those skilled in the art that data processing 10 may include many other devices, such as memories, controllers, etc., to perform different data processing functions.

Processor 11 and bus bridge 12 are interconnected by a point-to-point uni-directional bus 14. Since bus 14 is uni-directional, bus 14 is divided into a sub-bus 14a and a sub-bus 14b for two-way communication between processor 11 and bus bridge 12. Further, each of sub-buses 14a and 14b has a bus master and a bus slave, for sending and receiving command or data. For example, sub-bus 14a has a bus master 15 and a bus slave 16. A bus master is defined as a device that issues a command or data, and a bus slave is defined as a device that receives the command or data issued by the bus master.

All command or data transfers on sub-buses 14a, 14b are preferably in the form of packets that are either two beats in length (for command transfers) or four beats in length (for data transfers). Command or data packets that are issued on sub-buses 14a, 14b will each receive a response packet some fixed time later to indicate either the packet has been received and accepted, or some type of error or device busy condition has occurred. Packets that are not accepted will be reissued on the appropriate one of sub-buses 14a, 14b for completion. Both sub-buses 14a, 14b are highly pipelined in that multiple commands or data packets may be active on sub-buses 14a, 14b at one time. Command and data packets are in an active state until the appropriate responses for the command and data packets are received.

Each of sub-buses 14a, 14b can be further subdivided into two bus signal groups, namely, an outbound command/data bus group and an inbound response bus group. For example, the outbound command/data bus group of sub-bus 14a includes an address/data bus 21a, a packet start line 22a, and a parity signal line 23a; and the inbound response bus group of sub-bus 14a includes a response bus 24a and a response parity signal line 25a. Similarly, the outbound command/data bus group of sub-bus 14b includes an address/data bus 21b, a packet start line 22b, and a parity signal line 23b; and the inbound response bus group of sub-bus 14b includes a response bus 24b and a response parity signal line 25b. The numbers adjacent to buses/lines 21a–25a and 21a–25b indicate the width of the corresponding buses/lines (or the number of pins required on the device).

Figure 2:
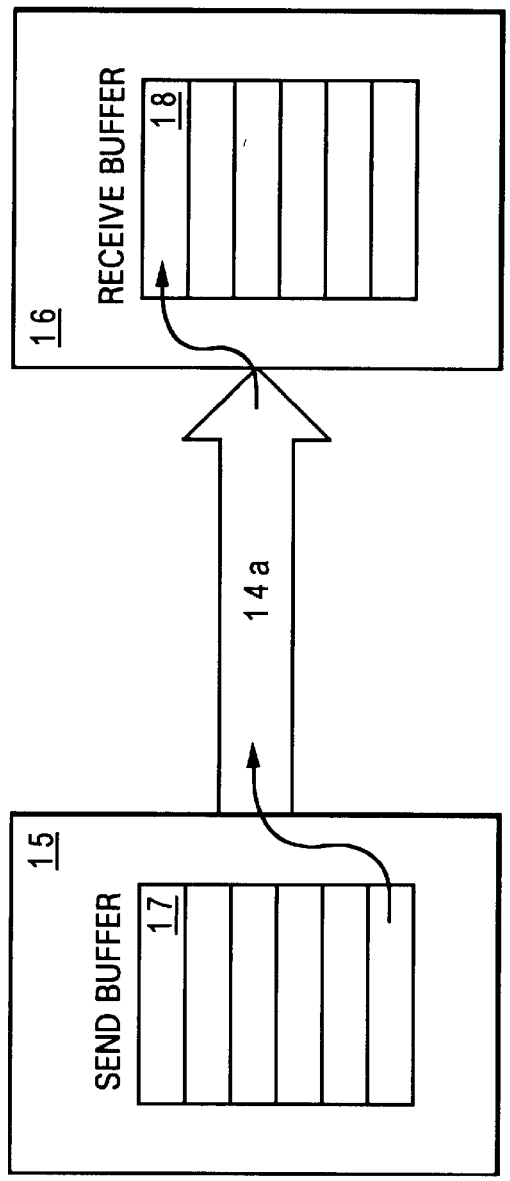
FIG. 2 is a detailed block diagram of a mechanism for transmitting command packets from a bus master to a bus slave, in accordance with a preferred embodiment of the present invention.

With reference now to FIG. 2, there is illustrated a detailed block diagram of a mechanism for transmitting command packets from bus master 15 to bus slave 16, in accordance with a preferred embodiment of the present invention. As shown, bus master 15 includes a send buffer 17 to hold multiple commands packets. Some of these command packets are order sensitive while others are non-order sensitive. Order sensitive command packets are defined as command packets that are required to be executed in a specific order with respect to each other; and non-order sensitive command packets are defined as command packets that can be executed in any order. Bus master 15 keeps track of the order of the order sensitive command packets utilizing a queue or other conventional order constructs known to those skilled in the relevant art.

Figure 3:
FIG. 3 is a block diagram of a command packet in accordance with a preferred embodiment of the present invention.

Referring now to FIG. 3, there is illustrated a block diagram of a command packet in accordance with a preferred embodiment of the present invention. As shown, a command packet 30 includes a command field 31, an ordered bit field 32, and a reset pipeline bit field 33. Command field 31 contains a command to be executed. Ordered bit field 32 indicates whether the command in command field 31 has an ordering requirement with respect to other command packets that have already been issued or will be issued; in other words, whether the command packet is order sensitive. In conjunction with ordered bit field 32, reset pipeline bit field 33 informs a bus slave, such as bus slave 16, which of the several issued order sensitive command packets should be processed first during a retry. The specific function of reset pipeline bit field 33 will become more apparent infra.

When transmitting command packets on a bus, such as sub-bus 14a in FIG. 2, bus master 15 can consecutively issue multiple command packets from send buffer 17 to a receive buffer 18 in bus slave 16 via sub-bus 14a. These command packets may intermix with both order sensitive command packets and non-order sensitive command packets. After arriving at receive buffer 18, each command packet may be processed and executed accordingly when a resource, such as a specific execution unit, is available. Order sensitive command packets, signified by their ordered bit field being set, are processed in accordance with the order in which they are sent from bus master 15. Non-order sensitive command packets, signified by their ordered bit field being not set, can be processed in any order as soon as an appropriate resource becomes available. Thus, when the bus slave is temporarily unable to process a group of command packets, for example, due to a lack of resources, all the command packets will be retried. These resources may be different, including execution units, memory buffers, etc. But as soon as the resources become available, the order sensitive command packets will be processed in order, with the order sensitive command packet having its reset pipeline bit field set being processed first. In the meantime, all non-order sensitive command packets can be processed in any order as soon as the resources become available. Furthermore, when order sensitive packets are being retried, the non-order sensitive packets can be send to bus slave 16 to process as soon as resources become available.

Each command packet that is issued by bus master 15 will receive a response packet from bus slave 16 after a specific time to indicate that the command packet has been accepted for execution or to indicate that the command packet cannot be accepted due to some type of error, such as device busy, occurring at bus slave 16. For example, when receive buffer 18 in bus slave 16 is being filled faster the command packets are being processed, bus slave 16 will issue bus master 15 a response packet including a device busy response. Accordingly, some of the command packets subsequently received by bus slave 16 will need to be retried by bus master 15.

As mentioned previously, among the command packets that are sent over sub-bus 14a from bus master 15 to bus slave 16, there are some command sequences that need to be executed in the order that they were sent. For a uni-directional bus that allows command packets to be reordered, this may cause significant "gaps" in the command pipeline. Since sub-bus 14a is a uni-directional bus, under the prior art, bus master 15 cannot issue a command packet to bus slave 16, and then cancels the command packet some time later. Thus, if a command packet has a ordering requirement with respect to other command packets, under the prior art, bus master 15 must wait for the response packet associated with the previously issued command packet to guarantee that the previously issued command packet will not be retried prior to sending the next command packet to sub-bus 14a. Depending on the latency of the response packet, huge delays may occur in issuing command packets and the overall bandwidth of sub-bus 14a may be reduced as a result. In order to resolve this problem, ordered bit field 32 and reset pipeline bit field 33, as shown in FIG. 3, allow the command ordering to be maintained without reducing the effective utilization of the bus bandwidth.

The ordering mechanism of the present invention is described here below, with reference to the high-level flow diagrams depicted in FIGS. 4a and 4b. Initially, bus master 15 issues multiple command packets to bus slave 16 via sub-bus 14a. Ordered bit field 32 of each order sensitive command packet is set while ordered bit field 32 of non-order sensitive command packets are not set.

Figure 4A:
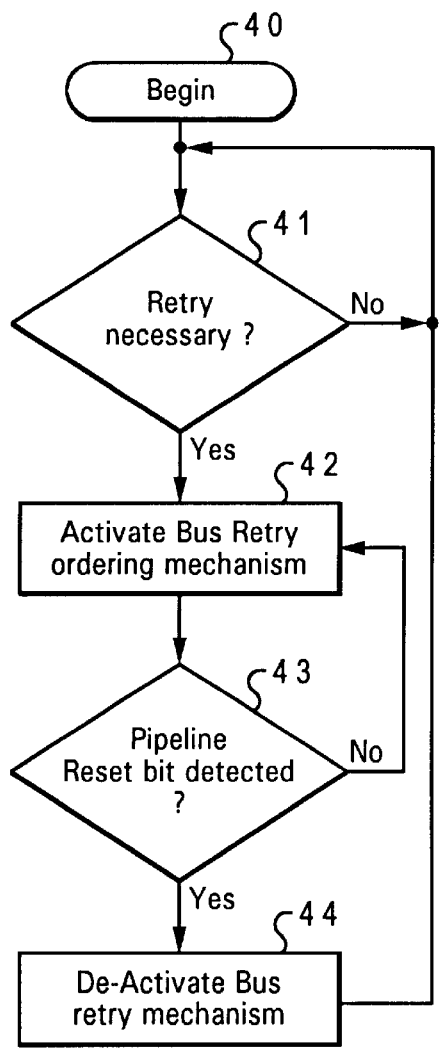
FIG. 4a is a high-level logic flow diagram of a method for a bus slave to receive command packets from a bus master, in accordance with a preferred embodiment of the present invention.

Starting in block 40 of FIG. 4a, bus slave 16 waits for a retry condition to occur, as shown in block 41. If a retry becomes necessary, bus slave 16 activates the bus retry ordering mechanism, as depicted in block 42. After the bus retry ordering mechanism has been activated, bus slave 16 will have to retry all subsequent order sensitive command packets, even resources become available subsequently. Bus slave 16 will continue the retry until bus slave 16 receives a command packet with reset pipeline bit field 33 set, as illustrated in block 43. At this point, bus slave 16 deactivates the bus retry ordering mechanism, as shown in block 44, and can again accept and process order sensitive command packets.

Figure 4B:
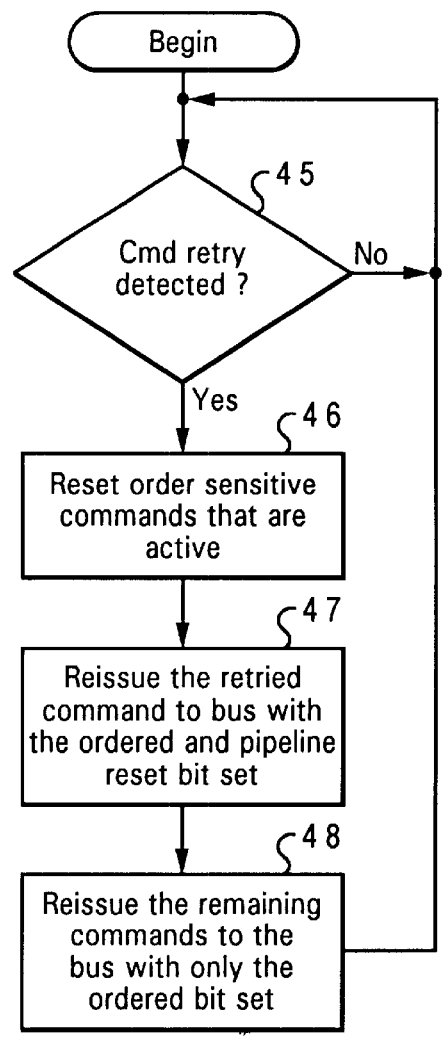
FIG. 4b is a high-level logic flow diagram of a method for a bus master to transmit command packets to a bus slave, in accordance with a preferred embodiment of the present invention.

Once bus master 15 receives a retry response packet from bus slave 16 for an issued order sensitive command packet, as shown in block 45 of FIG. 4b, bus master 15 will resend all order sensitive command packets that are in the active state, as depicted in block 46. Active state is defined as a command packet that has been issued to sub-bus 14a but has not received a response packet from bus slave 16. Bus master 15 reissues these command packets to sub-bus 14a again after setting pipeline reset bit 33 of the first of all active order sensitive command packet (i.e., the first among all other active order sensitive command packet to be issued), as illustrated in block 47. Afterwards, bus master 15 reissues the remaining order sensitive command packets, as shown in block 48.

As has been described, the present invention provides a method of transmitting command packets on a bus within a data processing system. With the present invention, a bus master may issue command packets on a bus to a bus slave without having to wait to see if the previously issued command is retried. Bus bandwidth can be fully utilized increasing the efficiency of the bus and thereby increasing system level performance. Furthermore, with the ordering mechanism of the present invention, the first of the active order sensitive command packet to be issued will be ensured to be processed first during a retry. Although command packets are utilized for the purpose of illustration, the present invention is also applicable to data or other types of packets.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method of transmitting packets from one device to another for processing, said method comprising the steps of:
   consecutively transmitting a plurality of packets from a first device to a second device, wherein said plurality of packets includes order sensitive packets and non-order sensitive packets;
   in response to a temporary inability of said second device to process a particular one of said order sensitive packets, activating a bus retry ordering mechanism within said second device such that any order sensitive packet subsequent to said particular one of said order sensitive packets within said second device is to be retried while concurrently processing said non-order sensitive packets within said second device in any order; and
   deactivating said bus retry ordering mechanism after the receipt of an order sensitive packet having a reset pipeline bit asserted to inform said second device said order sensitive packet is to be processed first during a retry, wherein said order sensitive packet contains an identical command as said particular one of said order sensitive packets.

2. The method according to claim 1, wherein said plurality of packets include command packets and data packets.

3. The method according to claim 1, wherein said method further includes a step of suspending transmission of order sensitive packets by said first device after said activation of said bus retry ordering mechanism, awaiting for a response packet from said second device to allow said first device to resume transmission of order sensitive packets.

4. The method according to claim 1, wherein said method further includes a step of continuously transmitting non-order sensitive packets from said first device to said second device while retrying said order sensitive packets.

5. The method according to claim 1, wherein said transmitting step further includes a step of transmitting said plurality of packets by said first device before receiving a response packet from said second device for each packet to confirm acceptance for execution.

6. An apparatus for transmitting packets from one device to another for processing, said apparatus comprising:
   means for consecutively transmitting a plurality of packets from a first device to a second device, wherein said plurality of packets includes order sensitive packets and non-order sensitive packets;
   means for activating a bus retry ordering mechanism within said second device, in response to a temporary inability of said second device to process a particular one of said order sensitive packets, such that any order sensitive packet subsequent to said particular one of said order sensitive packets within said second device is to be retried while concurrently processing said non-order sensitive packets within said second device in any order; and
   means for deactivating said bus retry ordering mechanism after the receipt of an order sensitive packet having a reset pipeline bit asserted to inform said second device said order sensitive packet is to be processed first during a retry, wherein said order sensitive packet contains an identical command as said particular one of said order sensitive packets.

7. The apparatus according to claim 6, wherein said plurality of packets include command packets and data packets.

8. The apparatus according to claim 6, wherein said first device further includes a means for suspending transmission of order sensitive packets after said activation of said bus retry ordering mechanism, awaiting for a response packet from said second device to allow said first device to resume transmission of order sensitive packets.

9. The apparatus according to claim 6, wherein said apparatus further includes means for continuously transmitting non-order sensitive packets from said first device to said second device while retrying said order sensitive packets.

10. The apparatus according to claim 6, wherein said transmitting means further includes a means for transmitting said plurality of packets by said first device before receiving a response packet from said second device for each packet to confirm acceptance for execution.

11. A computer program product for transmitting packets from one device to another for processing, said computer program product comprising:
   program code means for consecutively transmitting a plurality of packets from a first device to a second device, wherein said plurality of packets includes order sensitive packets and non-order sensitive packets;
   program code means for activating a bus retry ordering mechanism within said second device, in response to a temporary inability of said second device to process a particular one of said order sensitive packets, such that any order sensitive packet subsequent to said particular one of said order sensitive packets within said second device is to be retried while concurrently processing said non-order sensitive packets within said second device in any order; and
   program code means for deactivating said bus retry ordering mechanism after the receipt of an order sensitive packet having a reset pipeline bit asserted to inform said second device said order sensitive packet is to be processed first during a retry, wherein said order sensitive packet contains an identical command as said particular one of said order sensitive packets.

12. The computer program product according to claim 11, wherein said plurality of packets include command packets and data packets.

13. The computer program product according to claim 11, wherein said computer program product further includes program code means for suspending transmission of order sensitive packets after said activation of said bus retry ordering mechanism, awaiting for a response packet from said second device to allow said first device to resume transmission of order sensitive packets.

14. The computer program product according to claim 11, wherein said computer program product further includes program code means for continuously transmitting non-order sensitive packets from said first device to said second device while retrying said order sensitive packets.

15. The computer program product according to claim 11, wherein said transmitting step further includes a step of transmitting said plurality of packets by said first device before receiving a response packet from said second device for each packet to confirm acceptance for execution.

\* \* \* \* \*